United States Patent [19]

Alfonsi et al.

[11] 4,422,841
[45] Dec. 27, 1983

[54] HOT RUNNER SYSTEM IN PLASTICS MOLDING TOOLS

[76] Inventors: Dante Alfonsi, Hedegatan 16, 252 51 Helsingborg; Stefan Alfonsi, Stationsgatan 10, 253 73 Helsingborg, both of Sweden

[21] Appl. No.: 374,774

[22] Filed: May 4, 1982

[30] Foreign Application Priority Data

May 7, 1981 [SE] Sweden ................................ 8102863

[51] Int. Cl.³ .............................................. B29F 1/08
[52] U.S. Cl. ..................................... 425/548; 425/549
[58] Field of Search ................................ 425/548, 549

[56] References Cited

U.S. PATENT DOCUMENTS

| | | | |
|---|---|---|---|
| 3,189,948 | 6/1965 | Whitney | 425/548 X |
| 3,553,788 | 1/1971 | Putkowski | 425/548 X |
| 4,043,726 | 8/1977 | Tsunemoto et al. | 425/563 |

FOREIGN PATENT DOCUMENTS 2850932 1/1980 Fed. Rep. of Germany .

*Primary Examiner*—Thomas P. Pavelko
*Attorney, Agent, or Firm*—Shapiro and Shapiro

[57] ABSTRACT

A hot runner system for use in combination with plastics molding tools for injection molding of plastics material with injection from several sprues comprises a central inlet member, heated runners for distributing from the central inlet member plastics material to a number of sprue bushes in which heating cartridges are inserted. The sprue bushes are fixed by securing means to a platen and form, together with said platen and said inlet member, a stationary and mechanically rigid assembly wherein contact between hot parts of the sprue bushes and the platen occurs only in rotationally symmetrical contact surfaces. The heated runners are individually movable relative to said assembly, but such movements will not affect the positions of the sprue bushes or the central inlet.

3 Claims, 3 Drawing Figures

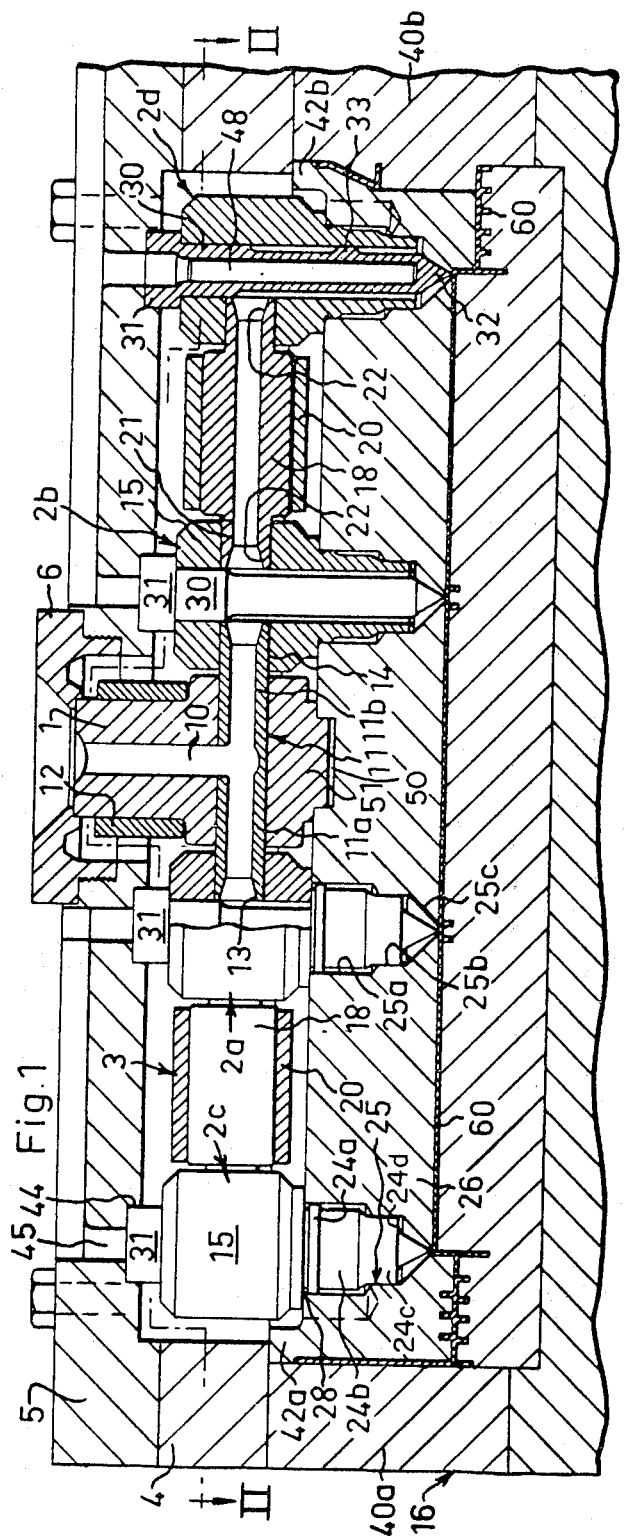
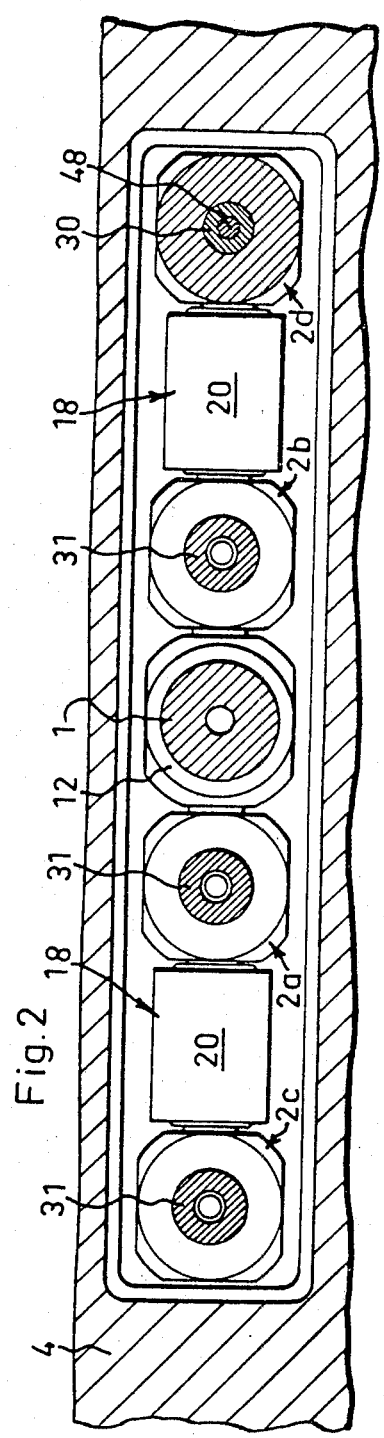

HOT RUNNER SYSTEM IN PLASTICS MOLDING TOOLS

BACKGROUND OF THE INVENTION

This invention relates to an assembly of components forming a hot runner system for molds in injection molding machines. These components include a central inlet member, a number of sprue bushes and runners for distributing a flow of viscous plastics composition from the central inlet to the individual sprue bushes. In the runner system sprue bushes may be located relatively close to the central inlet and may be located at a greater distance from the central inlet. More particularly, the invention relates to a runner system in the form of an assembly which comprises a number of standard components of identical construction. The system is intended primarily for molds having a plurality of mold cavities and for injection molding of articles of relatively large dimensions and may comprise a great number of sprue bushes which may be arranged in linear and in parallel arrays. The term central inlet implies, in general, that the inlet is common to a plurality of runners, but does not necessarily mean that it is the geometrical center of the system.

PRIOR ART

Hot runner assemblies are previously known and are used for molds having a plurality of mold cavities for injection molding of articles of relatively large surface dimensions. The advantage of hot runner molds is that the material is maintained in the molten state in the channels during the interval between each injection operation and the following one. In molds not provided with heated runner channels, material which has set in a runner channel after an injection molding operation cannot be used for the next molding operation. The channels must be emptied after each injection molding operation, and in many cases special ejection means must be used for purging the channels.

Prior art hot runner molds may be divided into two groups, i.e. hot runner molds of low overall height and hot runner molds of high overall height. In hot runner molds of low overall height, the runners are arranged in a platen having a central inlet. The platen is provided with bores for inserting electric heating cartridges thereinto. To prevent heat transfer between the hot runner platen and associated mold platens, it is desirable to permit some degree of floating movement of the runner platen between the mold platens by fixing the runner platen at a few points of attachment only. To this end the hot runner platen is enlarged relative to the mold platens and all surfaces between the sprue bushes and the mold platens are made planar to permit the necessary sliding movement of the platens relative to each other upon heat expansion.

In hot runner molds of relatively great overall height, the hot runner system consists substantially of connected pipes. In such systems, the central inlet is connected to a number of angle pieces by means of heated pipes. Also these angle pieces are heated and communicate with runner outlets. Such a construction which comprises intermediate heated connecting angle pieces imparts to the hot runner system a considerable overall height.

To sum up, hot runner systems of low overall height according to prior art technique suffer from the disadvantage that the runner outlets will be movable relative to the mold platen due to the heat expansion of the runner platen. In these constructions, the surfaces between the runner outlets or sprue bushes and the mold platens must be planar to permit the necessary sliding movement upon heat expansion. In hot runner constructions with distributing hot runners which are made up of pipes connected to special heated angle connectors, these angle connectors will impart to the construction a considerable overall height, and this brings the disadvantage that greater space is required for the hot runner mold.

SUMMARY OF THE INVENTION

It is the object of this invention to provide a system in which the above-mentioned disadvantages and restrictions are eliminated. The runner system according to the invention comprises a central inlet member, a plurality of connectible runner components, sprue bushes and means for attaching the sprue bushes to a mold platen, and this system of connected parts forms, together with the mold platen, a rigid assembly wherein detrimental movements due to differences in temperature between the components of the hot runner system and between the hot runner system and the components which form the mold are eliminated or substantially reduced. The areas of intersurface contact between the hot parts of the sprue bushes and the mold platen are of rotationally symmetrical form, and as a result heat expansion of the sprue bushes causes no relative displacement between the sprue bushes and the mold platen. Upon heat expansion of the sprue bushes, the relatively easy running fit between the sprue bushes and the mold platen turns into a harder fit, whereby local and circular areas of stress concentrations may arise in the immediate vicinity of the mutual contact surfaces. However, since the mutual contact surfaces are restricted to a minimum in order to minimize the heat transfer from the hot sprue bushes to the mold platen, the areas of circularly symmetrical stress concentrations will also be restricted to a minimum.

Furthermore, the system is so constructed that the central inlet member directly communicates, via heated connecting pipes, with a number of sprue bushes which, in their turn, may communicate with further sprue bushes via heated connecting channels, i.e. runners. By interconnecting the inlet member, the components which form the runners and the sprue bushes directly to each other and a possible direct interconnection between certain sprue bushes, angle pieces and other connecting means between the intermediate connecting components will become superfluous, and this results in its turn in a hot runner system of minimum overall height.

Furthermore, the sprue bushes and their attachment means are so constructed that the heaters, so-called heating cartridges in the sprue bushes may readily be exchanged without dismantling the assembly formed by the locking platen, the mold platen and the hot runner system.

Further characteristics and advantages of the invention will more fully appear from the following description of a preferred embodiment and the appended claims.

BRIEF DESCRIPTION OF THE DRAWINGS

In the following description, reference is made to the accompanying drawings in which FIG. 1 is a fragmentary vertical cross-sectional view of an injection mold platen and shows in a fragmentary and vertical cross-section a hot runner system according to the invention connected to and including a plurality of sprue bushes seated in bores in the upper mold platen;

FIG. 2 is a horizontal cross-sectional view substantially along line II—II in FIG. 1.

DETAILED DESCRIPTION OF THE PREFERRED EMBODIMENT

Figure 3:
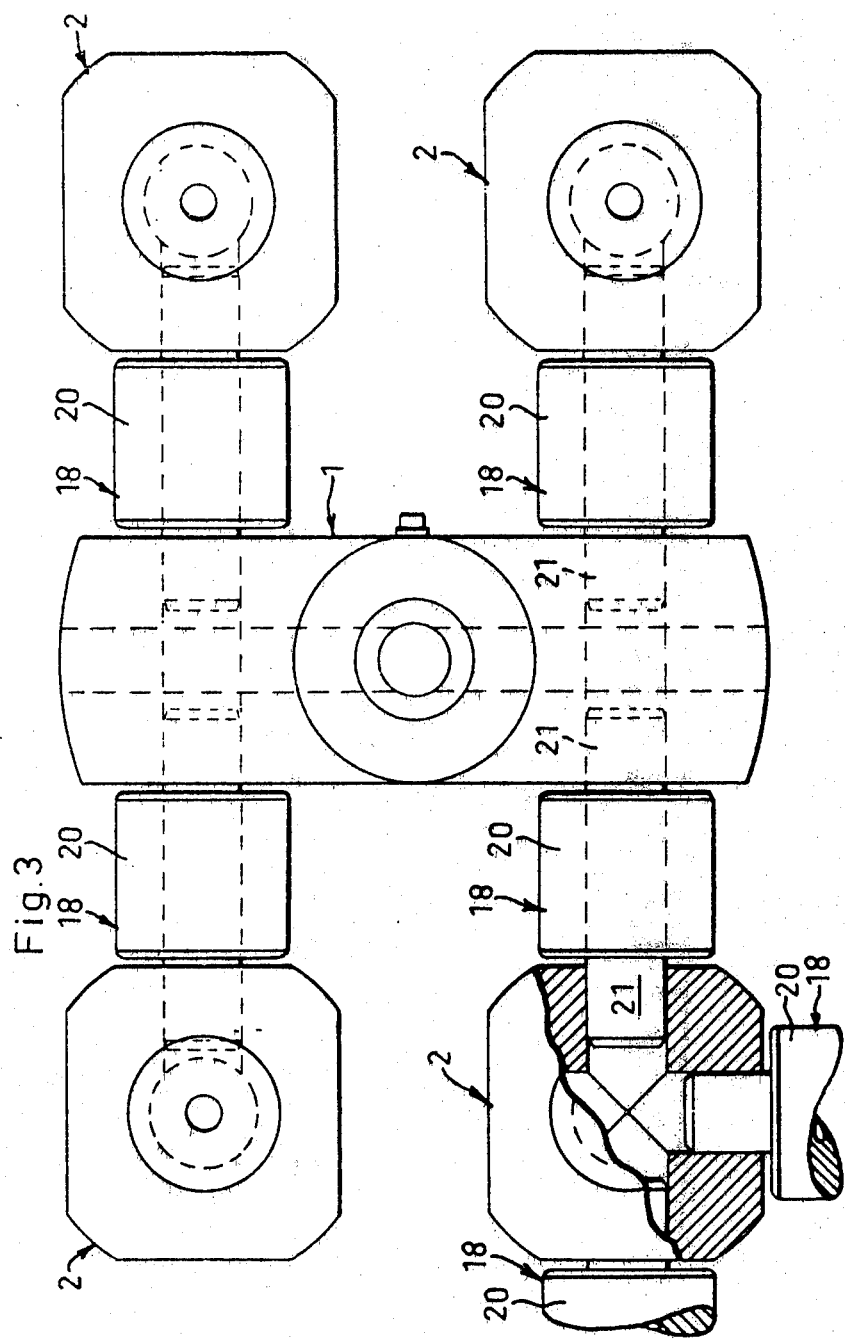
FIG. 3 is a top plan view of a modification of the hot runner system according to the invention and shows the central inlet member and four sprue bushes connected thereto by means of heated distributing pipes.

The hot runner system according to the embodiment of this invention and shown in FIGS. 1-2 comprises, as main components, a central inlet member 1, sprue bushes 2, connecting runner members 3, a spacer plate 4, preferably in the form of a circumferential frame, a locking plate 5, and a locking ring 6 for the central inlet member 1.

The central inlet member has a vertical inlet channel 10 which, as shown in FIG. 7, communicates with a distributing pipe 11 inserted as a bush with a tight fit in a bore in the central inlet member 1. This member 1 is heated by means of an annular, electrical heater 12 which is mounted on an upper portion of member 1.

The pipe 11 in the central inlet member forms with its opposite end portions a pair of branch conduits or runners 11a, 11b. The ends of these runners 11a, 11b are formed each with a conical end surface, as shown at 13 in FIG. 1. The opposite ends of the runner pipe 11 project from the opposite sides of the central inlet member 1 and are inserted with a tight fit in opposite radial bores 14 extending through upper enlarged wall portions 15 of a pair of adjacent sprue bushes 2a, 2b which are located on either side of and spaced from the central inlet member 1.

The runner system according to the invention may include as many sprue bushes 2 as are required for a given injection mold. The injection mold 16, which is shown partially in FIGS. 1 and 2, may be equipped with several sprue bushes 2 but only four sprue bushes arranged in a row are shown. Sprue bushes in the row on either side of the central inlet member 1, such as the sprue bushes 2b and 2d in the embodiment shown in FIGS. 1 and 2, may be connected in series with each other. To this end, the sprue bushes 2b, 2d on one side of the central inlet member 1 are connected to each other by means of a runner pipe 18.

In the embodiment shown this runner pipe 18 has an enlarged control portion which may be cylindrical and is heated by means of an electrical heater 20. This heater 20 is cylindrical, like the heater 12, and encloses the enlarged cylindrical portion of the runner pipe 18. The runner pipe 18 comprises at each end a projection 21 which is identical with the end portions 13 of the runner pipe 11 as regards the outer and inner diameters and the conical inner taper 22 at the mouth of each projection 21. The projections 21 are inserted in radial through bores in the enlarged upper wall portions of the sprue bushes 2b, 2d, which are identical with each other and with the sprue bushes 2a, 2c, apart from the numbers of through bores, which may be different.

The sprue bushes 2a, 2c on the other side of the central inlet member 1 are connected to each other in a manner and by means which are identical with those already described.

As shown in FIGS. 1 and 2, the upper enlarged wall portion 15 of each sprue bush 2a, 2b, 2c, 2d forms an upper head. Each sprue bush has a lower cylindrical end portion 24 which is stepped and is inserted in a stepped bore 25 in an upper platen 26. This platen forms an upper part of the mold 16. Between the head 15 and the lower cylindrical, stepped end portion 25 the sprue bush 2 has a shoulder provided with an annular and planar radial surface 28 which is seated on a planar portion of the upper surface of the mold platen 26 around the upper mouth of the stepped bore 25.

Each stepped bore 25 comprises a cylindrical upper end portion 25a, a cylindrical intermediate portion 25b of reduced diameter and a lower conical end portion 25c. The outer periphery of each stepped lower end portion 24 of the sprue bush comprises an upper, relatively short cylindrical portion 24a which contacts the upper part of the upper cylindrical bore portion 25a and forms an annular supporting surface having a relatively small axial dimension. This annular surface is followed by a first reduced diameter portion 24b which is spaced from the upper bore portion 25a and is followed by a second reduced diameter portion 24c which forms an annular supporting surface in contact with the surface of the intermediate cylindrical bore portion 25b. The lower end 24d of the sprue bush is spaced from the upper part of the conical lower end portion 25c of the bore 25.

Thus the sprue bush is supported in surface contact with the mold platen 26 only by means of small annular rotational surfaces, such as at 28, 24a and 24c. The advantages of this construction will be described below.

As seen in FIG. 1, each sprue bush forms a housing for a probe 30 which usually is called the torpedo and together with the sprue bush forms an injection nozzle. The probe 30 is of conventional construction and has an upper head 31 and a lower tip 32. The probe 30 is supported, in its upper part, by the inner peripheral surface of the sprue bush 2 and may also be supported in the sprue bush by means of radial projections 33. The head 31 is supported on the upper end of the sprue bush proper.

The sprue bushes 2 are fixed in a housing which comprises the upper mold platen 26, the locking plate 5 and the intermediate spacer plate 4 which preferably has the form of a circumferential frame and is supported on end portions 40a, 40b of the mold 26 and on end portions 42a, 42b of the upper mold platen 26. The locking plate 5 is supported on the spacer plate or frame 4 and is formed with cylindrical pockets 44 which accommodate the heads 31 of the probes 30.

The planar, circular bottoms of the pockets 44 are pierced by vertical bores 45 in the locking plate for a reason which will be described later.

Screw bolts (not shown) are inserted through corresponding holes in the locking plate 5 and the spacer frame 4 and are screwed into threaded holes in the end portions 40a, 40b of the mold 16, whereby the locking plate 5 is pressed downwardly against the spacer frame and the latter is clamped between the mold and the locking plate. At the same moment, the probes are locked in the sprue bushes, and the sprue bushes are clamped between the locking plate and the upper mold platen 26 and are thereby locked in correct position.

In a central, axial cavity in each probe 30 there is inserted a heating cartridge 48 which is removable through the corresponding opening 45 in the locking plate 25, and for such removal no further dismantling operations are necessary.

When an injection molding operation is effected, molten plastics material is forced through the inlet in the central member 1 and will flow through the central runner pipe 11 into and axially along the sprue bushes 2a, 2b in the spaces between the bushes and the probes. From the sprue bushes 2a, 2b, plastics material is injected into the mold cavity and is forced via the runner pipes 18 and therefrom into the mold cavity for forming an article 60 therein.

By using sprue bushes and central inlet members having connecting bores in three, four or more sides, a wide variety of runner system configurations may be obtained.

The height of the spacer plate or frame 4 is selected with such tolerances that, when the locking plate 5 is clamped in position, there is obtained a rigid assembly comprising the mold platen 26, the spacer frame 4, the mold parts 40a, 40b, the sprue bushes 2 and the locking plate 5. The sprue bushes 2 are held in well defined positions, on the one hand by the bores in the mold platen 26 and, on the other hand, because their upper parts, i.e. the probe heads 31, are held in the pockets 44 in the locking plate 5. The central inlet member 1 is fixed relative to the mold platen and the locking plate 5 by means of the locking ring 6 which is screwed into a threaded opening in the locking plate 5.

As will be evident from the above, the bores 25 in the mold platen in which the sprue bushes 2 are inserted, and the sprue bushes 2 are so designed that the contact surfaces between the sprue bushes and the mold platen 26 are reduced to a minimum. The space or gap between the two cylindrical contact surfaces 24a and 24c may be filled with air or with set plastics material which may have leaked past the lower contact surface 24c during an initial injection shot, and said space acts as a heat insulation, whether it be filled with air or with set plastics material. In the latter case, it also acts as an additional seal against further leakage of plastics material. The fit between the bores 25 in the mold platen 26 and the sprue bushes 2 is a close running fit along the cylindrical contact surfaces 24a, 24c. Also at the pockets 44 where the sprue bushes 2 are fixed relative to the attachment plate 26, the fit may be a close running fit.

In the upper surface of the mold platen 26, there is formed, according to the preferred embodiment shown, a cylindrical pocket 50 for receiving a cylindrical stud 51 at the lower end of the member 1. This will ensure that the central inlet member 1 will have a well defined position relative to the mold platen 26. The fit between the stud 51 of the central inlet member 1 and the pocket 50 in the mold platen 26 may be a close running fit. The contact between the stud 51 and the cylindrical pocket surface is again of the rotationally symmetrical type.

The contact surfaces between the hot parts of the hot runner system and the cold mold platen 26 thus consist of the cylindrical contact surfaces 24a and 24c of the sprue bushes 2, the planar, annular contact surfaces 25 and the cylindrical contact surface between the stud 51 of the central inlet member 1 and the mold platen 26 at the pocket 50. All of these contact surfaces are symmetrical with respect to rotation, which means that the parallel center lines of the sprue bushes 2 and the central inlet member 1, that are pependicular to mold platen 26, are not displaced in relation to the cold mold platen 26 when the sprue bushes and the central inlet member 1 are heated. Upon heat expansion of the sprue bushes, the fit along the cylindrical contact surfaces does not change character, but remains a close running fit which, however, may become somewhat closer. Between the mold platen 26 and the locking plate 5, there exists a certain initial clearance, such that upon heat expansion of the sprue bushes 2 a satisfactory fit will be effected between the sprue bushes and the locking plate 5 in the pockets 44 and between the sprue bushes and the mold plate in the area of the annular contact surfaces 24a, 24c. The same applies to the annular contact surfaces between the central inlet member 1 and the locking plate 5 and the mold platen 26, respectively. Since all contact surfaces are symmetrical with respect to rotation, all pressures on these surfaces will be distributed symmetrically, whereby displacements are avoided.

The runner pipes 18 are so fitted into the sprue bushes 2 that they are freely movable in their mountings upon longitudinal displacement due to heat expansion. As a result, the central inlet member 1 and the sprue bushes are affected only by the friction forces acting on the runner pipes during heat expansion thereof. However, these friction forces are so moderate that they cannot displace the sprue bushes or the central inlet member 1 relative to the mold platen 26.

Also the annular electrical heater 12 used for heating the central inlet member 1 can be replaced by unscrewing the locking ring 6 to give access to the heater 12.

The heaters for the runner pipes 18 each have a cylindrical inner circumference and enclose substantially completely the cylindrical outer surface of the runner pipe 18.

The central inlet member 1 may also have the form which is illustrated in FIG. 3. In that case, the sprue bushes can be so placed in the mold platen that their position coincides with the corner points of a rectangle. The components described make it possible to distribute the sprue bushes of the system in such a manner that they are disposed at the intersections of a grid, whereby the number of sprue bushes comprised by the hot runner system will, in principle, be unlimited.

Also other modifications of the system or the components thereof are possible without departing from the inventive concept as defined by the appended claims.

We claim:

1. A hot runner system for use in combination with a plastics molding tool having at least one mold cavity, said hot runner system being employed for injection molding of plastics material into said at least one cavity and comprising a heated central inlet means having an inlet channel means, a plurality of heated sprue bushes each having an outlet end portion and an opposite end portion, and a plurality of heated runner pipes connecting said inlet channel means with said sprue bushes, said molding tool comprising a mold platen having bores forming sockets for receiving the outlet end portions of said sprue bushes in positions for injecting plastics material into said at least one molding cavity, each of said sprue bushes and each of said sockets comprising cooperating annular contact surfaces for radially and axially locating said sprue bushes in said sockets, each of said sprue bushes forming a housing for a probe removably inserted therein, each probe having an inner tip end portion at the outlet end of the respective sprue bush and having an opposite outer end, said opposite end portion of each of the sprue bushes comprising a connecting head having at least one transverse channel for connecting the respective sprue bush with at least one of said runner pipes, each of said probes defining with its housing an annular space extending axially from the outlet end of the respective sprue bush, in communication with said at least one mold cavity, to the transverse channel of the respective sprue bush, each probe having an axial bore coaxial with said annular space and extending from the outer end of the respective probe to the tip end portion, and a heating element removably inserted into said axial bore from the outer end of the probe and removably fixed therein, said heating element being coaxial with said annular space and extending substantially along the whole length of the respective annular space for heating plastics material injected through said annular space and for heating the respective sprue bush substantially along the whole length of the annular space, each of said probes having a head at its outer end protruding from the respective sprue bush, and further comprising a clamping plate and means for securing said clamping plate to said mold platen and forcing said clamping plate to exert pressure on said heads of said probes for holding the heads of the probes clamped onto said opposite end portions of said sprue bushes and thereby holding the sprue bushes clamped and fixed in relation to said sockets.

2. A hot runner system for use in combination with a plastics molding tool having at least one mold cavity, said hot runner system being employed for injection molding of plastics material into said at least one cavity and comprising a heated central inlet means having an inlet channel means, a plurality of heated sprue bushes each having an outlet end portion and an opposite end portion, and a plurality of heated runner pipes connecting said inlet channel means with said sprue bushes, said molding tool comprising a mold platen having bores forming sockets for receiving the outlet end portions of said sprue bushes in positions for injecting plastics material into said at least one molding cavity, each of said sprue bushes and each of said sockets comprising cooperating annular contact surfaces for radially and axially locating said sprue bushes in said sockets, each of said sprue bushes forming a housing for a probe removably inserted therein, each probe having an inner tip end portion at the outlet end of the respective sprue push and having an opposite outer end, said opposite end portion of each of the sprue bushes comprising a connecting head having at least one transverse channel for connecting the respective sprue bush with at least one of said runner pipes, each of said probes defining with its housing an annular space extending axially from the outlet end of the respective sprue bush, in communication with said at least one mold cavity, to the transverse channel of the respective sprue bush, each probe having an axial bore coaxial with said annular space and extending from the outer end of the respective probe to the tip end portion, and a heating element removably inserted into said axial bore from the outer end of the probe and removably fixed therein, said heating element being coaxial with said annular space and extending substantially along the whole length of the respective annular space for heating plastics material injected through said annular space and for heating the respective sprue bush substantially along the whole length of the annular space, and comprising means for securing said probes in said sprue bushes and securing the latter in said sockets, said securing means including cooperating annular supporting surfaces of each probe and each sprue bush, cooperating supporting surfaces of said mold platen and each sprue bush and a clamping plate which is adapted to be removably fixed to said mold platen and to clamp said sprue bushes in operating positions in said sockets by clamping said probes in operating positions in said sprue bushes.

3. A hot runner system as claimed in claim 2, wherein each heating element is removable endwise from within the respective probe through an opening formed in said clamping plate.

* * * * *